United States Patent [19]

Woo et al.

[11] 4,386,682
[45] Jun. 7, 1983

[54] PISTON RETRACTION AND WEAR COMPENSATION FOR LOW-DRAG DISC BRAKES

[75] Inventors: Ji Y. Woo; Irving R. Ritsema, both of South Bend, Ind.

[73] Assignee: The Bendix Corporation, Southfield, Mich.

[21] Appl. No.: 252,631

[22] Filed: Apr. 9, 1981

[51] Int. Cl.³ .................... F16D 55/224; F16D 65/54
[52] U.S. Cl. .................................. 188/71.8; 188/72.3; 188/196 P; 192/111 A
[58] Field of Search ................. 188/71.7, 71.8, 72.3, 188/196 P; 192/111 A

[56] References Cited

U.S. PATENT DOCUMENTS

| | | | |
|---|---|---|---|
| 2,667,947 | 2/1954 | Lucien | 188/152 |
| 2,720,286 | 10/1955 | Bricker | 188/72 |
| 2,746,254 | 5/1956 | Lucien | 188/196 P |
| 2,817,419 | 11/1957 | Wolf | 188/71.8 |
| 2,934,174 | 4/1960 | Lucien | 188/71.8 |
| 3,218,051 | 11/1965 | Doetsch | 267/1 |
| 3,251,436 | 5/1966 | Afanador et al. | 188/73 |
| 3,265,160 | 8/1966 | Elberg et al. | 188/71.8 |
| 3,273,676 | 9/1966 | Thirion | 188/73 |
| 3,377,076 | 4/1968 | Burnett | 277/171 |
| 3,421,604 | 1/1969 | Hobbs | 188/73 |
| 3,811,366 | 5/1974 | Angelis et al. | 188/196 P |
| 4,161,239 | 7/1979 | Karasudani | 188/71.8 |
| 4,163,483 | 8/1979 | Baba et al. | 188/71.8 |
| 4,334,597 | 6/1982 | Tovagliaro | 188/71.8 |
| 4,336,746 | 6/1982 | Morith | 188/71.8 |

FOREIGN PATENT DOCUMENTS

| | | | |
|---|---|---|---|
| 2610651 | 9/1977 | Fed. Rep. of Germany | 188/71.8 |
| 52-108827 | 3/1977 | Japan | 188/72.3 |
| 2026632 | 2/1980 | United Kingdom | 188/71.8 |

Primary Examiner—Robert J. Spar
Assistant Examiner—R. R. Diefendorf
Attorney, Agent, or Firm—Paul David Schoenle; Ken C. Decker

[57] ABSTRACT

A disc brake 10 has a caliper 34 including apparatus 52 for retracting the piston 68 of the fluid motor portion 44 of the caliper to a non-braking position when the brake is not applied. Consequently, runout, wobble, or axial movement of the brake disc 12 may space the friction elements 62, 64 of the brake from the friction faces 18, 20 of the brake disc so that the friction elements do not drag on the disc when the brake is not applied.

1 Claim, 5 Drawing Figures

PISTON RETRACTION AND WEAR COMPENSATION FOR LOW-DRAG DISC BRAKES

The invention relates to an improvement to low-drag disc brakes having an apparatus therein for retracting the caliper piston upon the termination of a brake application. In particular, the invention relates to an improvement to disc brakes of the type having a caliper straddling a rotatable brake disc and cooperating with a pair of friction elements to urge the friction elements into engagement with the brake disc. The friction elements frictionally engage the brake disc to effect a brake application retarding rotation of the disc. The caliper defines a bore movably receiving a piston and cooperating therewith to define a variable-volume chamber. Pressurized fluid is supplied to the variable-volume chamber to move the piston to effect a brake application. The piston cooperates with one of the friction elements to move the friction element into engagement with the brake disc during a brake application. The caliper includes an apparatus retracting the piston to a non-braking position in response to the release of pressurized fluid from the variable-volume chamber. Consequently, the piston does not hold the friction elements in engagement with the brake disc. As a result, runout, wobble, or axial movement of the brake disc moves the friction elements away from the disc so that the friction elements do not drag on the disc. The fuel economy of the vehicle upon which the brake is mounted is improved by the reduced drag on the brake disc.

A disc brake is known in accordance with U.S. Pat. No. 2,746,254 issued May 22, 1956 to R. Lucien wherein the caliper defines a bore movably receiving a sleeve member. The sleeve member receives a relatively movably piston. Packing rings carried by the caliper and by the piston frictionally and sealingly engage the sleeve member. Consequently, the caliper, piston, and sleeve member cooperate to define a variable-volume chamber for receiving pressure fluid. The piston and sleeve member move together outwardly of the bore to urge a friction element into engagement with a brake disc to effect a brake application. Because the sleeve member has only a predetermined and limited axial freedom of movement relative the caliper, the piston may be moved relative the sleeve during a brake application because the pressurized fluid acting on the piston moves the piston to urge the friction element into engagement with the brake disc after the sleeve member has reached the limit of its movement. The sleeve member and caliper cooperate to define an annular chamber circumscribing the sleeve member. A coil spring is received in the annular chamber. The coil spring cooperates with the caliper and with the sleeve member to bias the sleeve member into the bore. Because the packing rings frictionally couple the piston and sleeve member from movement in unison, the spring retracts the piston into the bore a distance equal to the predetermined freedom of movement of the sleeve member when the pressurized fluid is released from the variable-volume chamber.

With a disc brake having a piston retracting apparatus of the type illustrated in the patent to Lucien, the caliper includes many component parts, which parts add significantly to the manufacturing costs of the brake. Additionally, the coil spring, and the annular chamber which is necessary for receiving the coil spring, increases the size of the caliper.

The invention as claimed is intended to avoid the drawbacks of prior disc brakes by providing an improved disc brake wherein the piston retracting apparatus is compact and adds very few component parts to the caliper. The invention provides a disc brake wherein the sleeve member and caliper cooperate to define an annular chamber opening radially outwardly from and contiguous to the piston. An annular wave spring, a multitude of coil springs, or an annular resilient elastomeric member are received in the annular chamber to bias the sleeve to a non-braking position. Because the annular chamber is contiguous to the piston, the size of the caliper is only slightly, if at all, increased when compared to disc brakes without piston retracting apparatus.

The advantages offered by the invention are mainly that the piston retracting apparatus of the caliper includes very few component parts compared to prior calipers with piston retracting apparatus; the retracting apparatus is compact and adds little, if at all, to the size of the caliper; because of the small size of the retracting apparatus, the invention may be incorporated into castings or forgings which are presently utilized to make disc brake calipers which lack the piston retracting feature offered by the invention; because in many cases presently existing caliper designs may be converted to low-drag calipers, the invention makes low-drag disc brakes available at a lower cost than prior low-drag disc brakes; moreover, because of the invention the fuel saving advantages offered by low-drag disc brakes may be made available to the general public at an earlier date and at a lower cost than would be the case without the invention.

Three embodiments of the invention are described in detail below with reference to drawing figures which illustrate only these three specific embodiments, in which.

Figure 1:
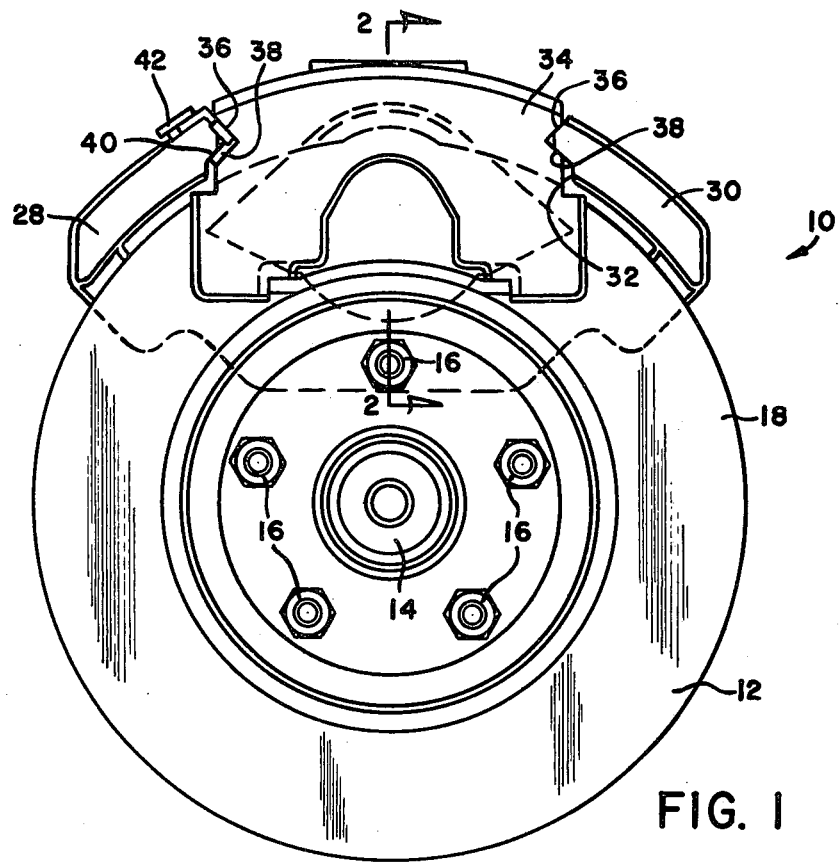
FIG. 1 is an elevation view of a disc brake embodying the invention.
Figure 2:
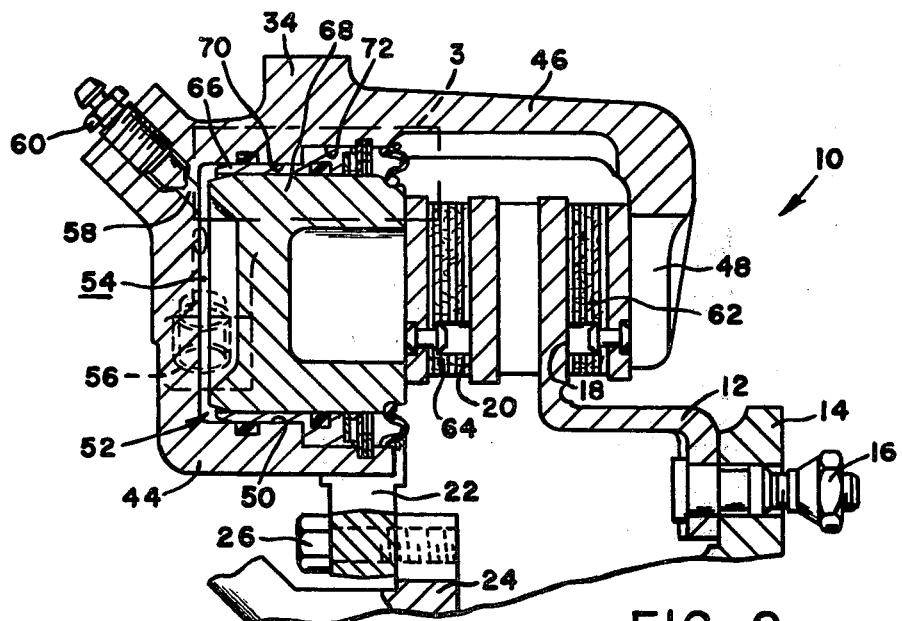
FIG. 2 is a fragmentary cross-sectional view taken along the line 2—2 of FIG. 1.

With reference to FIGS. 1 and 2, a disc brake 10 includes a brake disc 12 which is coupled for rotation in unison with a rotatable vehicle axle 14 via threaded fastener 16. The brake disc 12 includes friction faces 18 and 20 on opposite sides thereof.

A torque member 22 is connected to a non-rotatable portion of the vehicle axle housing 24 via threaded fasteners 26. The torque member 22 includes a pair of circumferentially spaced arms 28 and 30 which define a recess 32 therebetween. A caliper 34 is received in the recess 32 and straddles the brake disc 12. The caliper 34 includes a pair of axially extending V-shaped grooves 36 which slidably cooperate with coincident V-shaped abutments 38 on the arms 28 and 30 of the torque member 22 so that the caliper 34 is axially movable relative the torque member and brake disc. The Y-shaped grooves and abutments cooperate to substantially prevent radial and circumferential movement of the caliper 34 relative the torque member 22. The abutment 38 on the torque member arm 28 is defined by a U-shaped key 40 which is slidably received between the caliper 34 and the arm 28. The key 40 is secured to the torque member 22 via removable threaded fasteners 42 (only one of which is visible in FIG. 1). The key 40 is removable axially from between the arm 28 and the caliper 34 so that the caliper may be withdrawn radially from the recess 32.

Turning now to FIG. 2, the caliper 34 includes a fluid motor portion 44, a bridge portion 46 which spans the outer perimeter of the brake disc 12, and a radially inwardly extending reaction portion 48. The fluid motor portion 44 of caliper 34 defines a bore 50 which movably receives a piston assembly 52. The caliper 34 and the piston assembly 52 cooperate to define a variable-volume chamber 54. A passage 56 connects the chamber 54 to a source of pressurized fluid; for example, to the master cylinder of a vehicle brake system. A second passage 58 leads from the chamber 54 to a bleed screw 60 which may be opened to purge air from the chamber 54. A friction element 62 is received between the reaction portion 48 of the caliper 34 and the friction face 18 of the brake disc 12. Similarly, a friction element is received between the friction face 20 and the piston assembly 52. As is well known in the art, when pressurized fluid is supplied to chamber 54 via passage 56, the piston assembly 52 moves outwardly of the bore 50 (rightwardly, viewing FIG. 2) to force the friction element 64 into engagement with the friction face 20. Consequently, reaction forces from the fluid motor portion 44 move the caliper 34 leftwardly, viewing FIG. 2. The reaction forces are transmitted via the bridge portion 46 and reaction portion 48 to the friction element 62 so that the friction element 62 is forced into engagement with the friction face 18. Moreover, frictional engagement of the element 62 and 64 with the faces 18 and 20, retards rotation of the brake disc 12 and axle 14.

Figure 3:
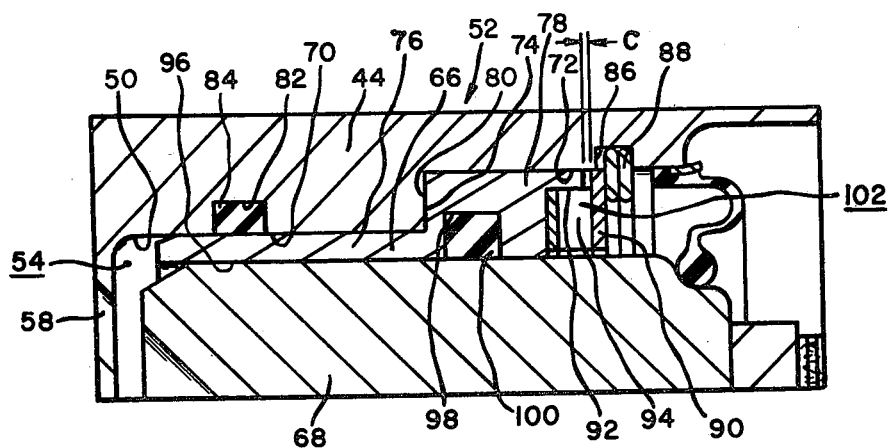
FIG. 3 is an enlarged fragmentary view of an encircled portion of FIG. 2.

Upon inspection of FIG. 3, it will be apparent that the piston assembly 52 includes a coaxially arranged sleeve member 66 and piston 68. The bore 50 of the fluid motor portion 44 of caliper 34 is stepped to provide a small diameter portion 70 and a large diameter portion 72. The bore portions 70 and 72 cooperate to define a shoulder or abutment 74. Similarly, the sleeve member 66 includes a small diameter portion 76 and a large diameter portion 78. The portions 76 and 78 cooperate to define a shoulder or abutment 80. The sleeve member 66 is slidably received in the bore 50 so that the abutments 74 and 80 are engageable. A groove 82 circumscribed the small diameter bore portion 70. An annular sealing member 84 is received in the groove 82. The sealing member 84 slidably and sealingly cooperates with the sleeve member 66 to bound the variable-volume chamber 54. Consequently, the left end of the sleeve member 66 is exposed to the pressurized fluid in the chamber 54. Another groove 86 circumscribes the large diameter bore portion 72. An annular retaining ring 88 is removably received in the groove 86 and extends radially inwardly into the bore portion 72. An annular member or washer 90 is received in the bore portion 72 between the retaining ring 88 and the right end of the sleeve member 66. The sleeve member portion 78 defines an annular recess 92 adjacent the washer 90. A resilient member or annular wave spring 94 is received in the recess 92 and engages the sleeve member 66 and the washer 90. Consequently, the sleeve member 66 is biased inwardly of the bore 50 (leftwardly viewing FIG. 3) by the wave spring 94 so that the abutments 74 and 80 engage. The sleeve member 66 and washer 90 define an axial clearance C when the abutments 74 and 80 are engaged.

The sleeve member 66 defines a bore 96 having a substantially uniform diameter. The piston 68 is slidably received into the bore 96. Because the bore 96 is of substantially constant diameter, the sleeve member portion 78 comprises a radially thickened portion of the sleeve member 78. A groove 98 is defined by the portion 78 circumscribing the bore 96. An annular sealing member 100 is received in the groove 98. The sealing member 100 slidably and sealingly engages the piston 68 to bound the variable-volume chamber 54. As a result, the left end of the piston 68 is exposed to the pressurized fluid in the chamber 54. The sealing members 84 and 100 are selected so that the member 84 has a relatively low coefficient of friction with the sleeve member 66 while the member 100 has a relatively high frictional coefficient with the piston 68. Consequently, the sleeve member and piston are frictionally coupled for movement in unison by the sealing member 100 which allows relative movement therebetween in response to a force overcoming the frictional engagement of the seal 100 with the piston 68.

Upon further inspection of FIG. 3, it will be apparent that the recess 92 of sleeve member 66 and the washer 90 cooperate to define a chamber 102 opening radially outwardly of and contiguous to the piston 68. The chamber 102 is adjacent to clearance C and receives the wave spring 94.

Figure 4:
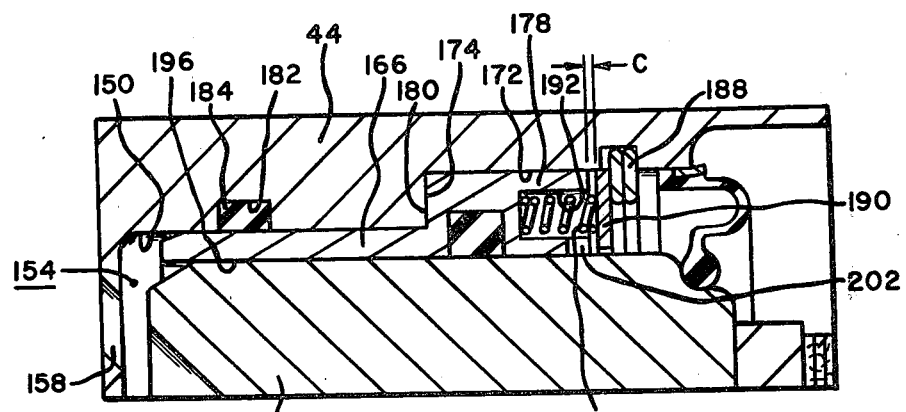
FIG. 4 is a fragmentary cross-sectional view similar to FIG. 3 and illustrates an alternative embodiment of the invention.

FIG. 4 illustrates an alternative embodiment of the invention which is substantially the same as the embodiment illustrated by FIG. 1 with the exception of features to be hereinafter explained. In order to obtain reference numerals for use in FIG. 4, features analogous to those illustrated in FIG. 3 are referenced in FIG. 4 by the same numeral used in FIG. 3 and increased by 100.

In the embodiment of the invention illustrated by FIG. 4, the portion 178 of the sleeve member 166 defines a multitude of circumferentially arranged, axially extending blind bores or recesses 192 (only one of which is shown in FIG. 4). A multitude of resilient members or coil compression springs 194 are received in the recesses 192. The springs 194 at their left end engage the bottom of the bores 192 and at their right ends engage the washer 190. Consequently, the multitude of springs 194 in concert bias the sleeve member 166 leftwardly so that the abutments 174 and 180 engage. The right end of the sleeve member 166 is spaced from the washer 190 when the abutments 174 and 180 are engaged so that the sleeve member and washer cooperate to define a chamber 202 opening radially outwardly of the piston 168. The chamber 202 is adjacent to clearance C and communicates with the recesses 192.

Figure 5:
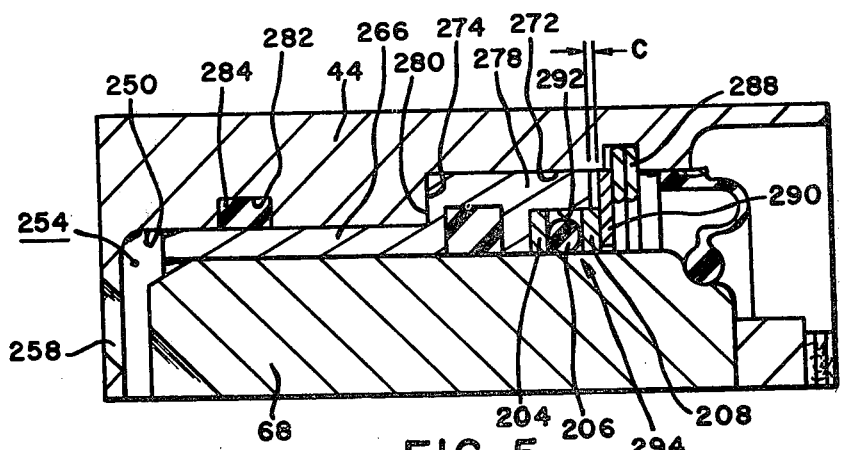
FIG. 5 is a fragmentary cross-sectional view similar to FIGS. 3 and 4 and illustrates another alternative embodiment of the invention.

FIG. 5 illustrates yet another alternative embodiment of the invention. Features illustrated in FIG. 5 which are analogous to those illustrated in FIG. 3 are referenced by the same numeral used in FIG. 3 and increased by 200.

Turning now to FIG. 5, it will be seen that the embodiment of the invention illustrated by FIG. 5 is substantially similar to the embodiments illustrated by FIGS. 3 and 4 with the exception of features to be hereinafter explained. In the embodiment of the invention illustrated in FIG. 5, the radially thickened portion 278 of the sleeve member 266 defines an annular recess 292 which is similar to the recess 92 of the embodiment illustrated in FIG. 3. A washer 290 is received in the bore portion 272 between a retaining ring 288 and the sleeve member 266. An annular resilient member or assembly 294 is received in the recess 292. The resilient assembly 294 includes a first annular semi-rigid cushion washer 204 which engages the sleeve member 266, a yieldably resilient annular elastomeric member 206, and a second annular semi-rigid cushion washer 208 which engages the washer 190. The cushion washers 204, 208 may be made from a polymeric material. For example, washers 204, 208 may be made from Teflon. The axial spacing of the cushion washers 204 and 208 is slightly less than the axial dimension of the elastomeric member 206 so that the resilient assembly 294 biases the sleeve member 266 leftward to engage the shoulders 274 and 280.

The embodiments of the invention illustrated by FIGS. 1 through 5 operate as follows;

When pressurized fluid is supplied to the variable-volume chamber 54 (154, 254) (parenthetical references to analogous features of FIGS. 4 and 5 will be hereinafter omitted and considered subsumed in the cited reference numeral of FIG. 1, where appropriate), the piston assembly 52 is moved outwardly of the bore 50 (rightwardly, viewing FIGS. 2–5) through the clearance C whereupon the right end of the sleeve member 66 abuts the washer 90. As the sleeve member 66 moves rightwardly, it axially contracts the resilient member 94. In the case of the embodiment illustrated by FIG. 5, the axial contraction of the resilient assembly 294 distorts the elastomeric member 206 so that its axial dimension is reduced by an amount substantially equal to the clearance C. If the friction elements 62 and 64 have worn sufficiently to require further rightward movement of the piston 68 in order to effect a brake application, the pressurized fluid in the chamber 54 moves the piston 68 rightwardly relative the sleeve member 66 to engage the friction element 64 with the brake disc 12.

When the pressurized fluid is released from the chamber 54, the resilient member 94 expands axially, moving the sleeve member 66 leftwardly through the clearance C to engage the abutments 74 and 80. Consequently, runout, wobble, or axial movement of the brake disc 12 moves the friction element 64 leftwardly, viewing FIGS. 2–5, so that the friction element 64 does not drag on the brake disc. Similarly, the friction element 62 and caliper 34 are moved rightwardly so that the friction element 62 does not drag on the brake disc. Those skilled in the art recognize that runout or wobble is present in all brake discs because of imperfections in the disc or axle upon which the disc is carried. Also, axial movement of the brake disc relative to torque member 30 occurs due to axial clearances in the bearings which journal the axle 14. Thus, a disc brake according to the invention utilizes imperfections and relative movements of the brake components so that the friction elements do not drag on the brake disc in the non-braking position of the brake.

We claim:

1. An improvement to a low-drag disc brake caliper having a fluid motor portion of the type including: a sleeve member reciprocably received in the caliper and frictionally coupled for movement in unison with a relatively movable pressure-responsive piston which is received by said sleeve member; said caliper body, sleeve member, and piston cooperating to substantially define a variable-volume chamber for said fluid motor portion, said variable-volume chamber receiving a pressurized fluid to move said piston and said sleeve member, said piston moving a friction element to effect a brake application, and resilient means for biasing said sleeve member to a retracted position relative to said caliper in engagement with a shoulder on said caliper, said sleeve member imparting movement to said piston via the frictional coupling to retract said piston upon termination of braking, and said caliper carrying an abutment member opposing said sleeve member in the direction of said friction element, the improvement being characterized in that an annular chamber is defined substantially by said sleeve member and said piston, said annular chamber opening radially inwardly and extending to said piston, said annular chamber receiving said resilient means, said sleeve member including a small diameter portion adjacent said variable-volume chamber and a large diameter portion opposing said shoulder and said abutment member, said large diameter portion including a recess forming said annular chamber, said large diameter portion being normally spaced from said abutment member in its rest position and said resilient means extends outwardly of said recess to engage said abutment member whereby said resilient means is compactly arranged between said sleeve member and said abutment member.

* * * * *